(12) United States Patent
Wheelock et al.

(10) Patent No.: US 11,125,899 B2
(45) Date of Patent: Sep. 21, 2021

(54) RESERVOIR MATERIALITY BOUNDS FROM SEISMIC INVERSION

(71) Applicants: Brent Wheelock, Morristown, NJ (US); Jan Schmedes, Bellaire, TX (US); Ratnanabha Sain, Houston, TX (US)

(72) Inventors: Brent Wheelock, Morristown, NJ (US); Jan Schmedes, Bellaire, TX (US); Ratnanabha Sain, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 564 days.

(21) Appl. No.: 16/036,371

(22) Filed: Jul. 16, 2018

(65) Prior Publication Data
US 2019/0056518 A1    Feb. 21, 2019

Related U.S. Application Data

(60) Provisional application No. 62/545,748, filed on Aug. 15, 2017.

(51) Int. Cl.
*G01V 1/30* (2006.01)
*G01V 99/00* (2009.01)

(52) U.S. Cl.
CPC ............ *G01V 1/306* (2013.01); *G01V 99/005* (2013.01); *G01V 2210/6244* (2013.01)

(58) Field of Classification Search
CPC ........... G01V 1/306; G01V 2210/6244; G01V 99/005; G01V 1/303; G01V 1/28;
(Continued)

(56) References Cited

U.S. PATENT DOCUMENTS

| | | | | |
|---|---|---|---|---|
| 5,305,209 A | * | 4/1994 | Stein | E21B 49/008 702/13 |
| 5,764,515 A | * | 6/1998 | Guerillot | G01V 1/30 702/2 |

(Continued)

FOREIGN PATENT DOCUMENTS

| | | |
|---|---|---|
| EP | 3 121 622 A1 | 1/2017 |
| WO | WO 2007/008382 A2 | 1/2007 |

OTHER PUBLICATIONS

Zakirov et al., "Optimizing Reservoir Performance by Automatic Allocation of Weil Rates", ECMOR V pp. 375-384, 1996 (Year: 1996).*

(Continued)

*Primary Examiner* — Regis J Betsch
(74) *Attorney, Agent, or Firm* — ExxonMobil Upstream Research Company, Law Department

(57) ABSTRACT

A method including: obtaining geophysical data for a subsurface region; generating, with a computer, at least two subsurface property models of the subsurface region for at least two subsurface properties by performing an inversion that minimizes a misfit between the geophysical data and forward simulated data subject to one or more constraints, the inversion including generating updates to the at least two subsurface property models for at least two different scenarios that both fit the geophysical data with a same likelihood but have different values for model materiality, with the model materiality being posed as an equality constraint in the inversion, wherein the model materiality is a functional of model parameters that characterize hydrocarbon potential of the subsurface region; analyzing a geophysical data misfit curve or geophysical data misfit likelihood curve, over a predetermined range of values of the model materiality to identify the at least two subsurface property models that correspond to a high-side and low-side, respectively, for (Continued)

each of the at least two subsurface properties, with the high-side and low-side quantifying uncertainties in the subsurface properties; and prospecting for hydrocarbons in the subsurface region with the at least two models that correspond to the high-side and the low-side for each of the at least two subsurface properties.

19 Claims, 6 Drawing Sheets

(58) Field of Classification Search
    CPC .............. G01V 1/30; G01V 2210/624; G01V
                        2210/6242; G01V 2210/622; G01V
                        2210/6222; G01V 2210/6224; G01V
                                                      2210/6226
    See application file for complete search history.

(56)  References Cited

U.S. PATENT DOCUMENTS

| | | | | |
|---|---|---|---|---|
| 5,798,982 | A * | 8/1998 | He | G01V 1/306 367/28 |
| 6,980,940 | B1 * | 12/2005 | Gurpinar | E21B 43/00 703/10 |
| 8,095,345 | B2 | 1/2012 | Hoversten | |
| 2002/0013661 | A1 * | 1/2002 | Van Riel | G01V 1/306 702/2 |
| 2009/0299638 | A1 * | 12/2009 | Saltzer | G01V 1/306 702/14 |
| 2018/0156932 | A1 * | 6/2018 | Sain | G01V 1/306 |

OTHER PUBLICATIONS

Pedersen et al., "Seismic Snapshots for Reservoir Monitoring", Oilfield Review Winter 1996, pp. 32-43 (Year: 1996).*
Briggs et al., "Trends in Reservoir Management", Oilfield Review, Jan. 1992, pp. 8-24 (Year: 1992).*
Saltzer et al., "Exploiting the non-uniqueness of seismic inversion to obtain alternate scenarios of economic interest", SEG!New Orleans 2006 Annual Meeting (Year: 2006).*
U.S. Appl. No. 62/429,475, filed Dec. 2, 2016.
Avdeev, D. (2005) "Three-Dimensional Electromagnetic Modelling and Inversion from Theory to Application", *Surveys in Geophysics*, Springer, 26, pp. 767-799.
Buland et al. (2003) "Bayesian Linearized AVO Inversion", Geophysics, vol. 68, No. 1 (Jan.-Feb. 2003), pp. 185-198.
Constable et al. (1987) "Occam's Inversion: A Practical Algorithm for Generating Smooth Models from Electromagnetic Sounding Data", *Geophysics*, vol. 52, No. 3 (Mar. 1987), pp. 289-300.
Egbert et al. (2012) "Electromagnetic Recipes for Electromagnetic Inverse Problems", *Geophys. J. Intl.*, 189, pp. 251-267.
Eidsvik et al. (2004) "Stochastic Reservoir Characterization Using Prestack Seismic Data", *Geophysics*, vol. 69, No. 4 (Jul.-Aug. 2004), pp. 978-993.
Gouveia et al. (1998) "Bayesian Seismic Waveform Inversion: Parameter Estimation and Uncertainty Analysis", *Journal of Geophysical Research*, vol. 103, No. B2, Feb. 10, 1998, pp. 2759-2779.
Hu et al. (2011) "Preconditioned non-linear conjugate gradient method for frequency domain full-waveform seismic inversion", *Geophysical Prospecting*, EAGE, 59, pp. 477-491.
Lawson et al. (1995) Chapter 23—Linear Least Squares with Linear Equality Constraints by Weighting, Solving Least Squares Problems, *Society for Industrial and Applied Mathematics*, pp. 158-173.
Newman et al. (2000) "Three-dimensional magnetotelluric inversion using non-linear conjugate gradients", *Geophys. J. Int.*, vol. 140, pp. 410-424.
Rimstad et al. (2010) "Impact of Rock-Physics Depth Trends and Markov Random Fields on Hierarchical Bayesian Lithology/Fluid Prediction", *Geophysics*, vol. 75, No. 4 (Jul.-Aug. 2010), pp. R93-R108.
Saltzer et al. (2006) "Exploiting the Non-Uniqueness of Seismic Inversion to Obtain Alternate Scenarios of Economic Interest", *SEG Technical Program Expanded Abstracts*, pp. 1670-1673.
Stark et al. (1995) "Bounded-variable least-squares: an algorithm and applications", *Computational Statistics*, 10, pp. 129-129.
Xu et al. (1995) "A new velocity model for clay-sand mixtures," *Geophysical Prospecting*, 43, pp. 91-118.
Brian Russell (2016) "*Stochastic vs Deterministic Pre-stack Inversion Methods*,"Dec. 1, 2016, XP055517018, Retrieved from the Internet: URL: https://www.cgg.com/data/1/rec_docs/3414_3412_Stochastic_vs_Deterministic_Inversion_Russell.pdf.

* cited by examiner

RESERVOIR MATERIALITY BOUNDS FROM SEISMIC INVERSION

CROSS REFERENCE TO RELATED APPLICATION

This application claims the benefit of U.S. Provisional Application Ser. No. 62/545,748, filed Aug. 15, 2017, the disclosure of which is incorporated herein by reference.

TECHNOLOGICAL FIELD

Exemplary embodiments described herein pertain to geophysical prospecting. More specifically, exemplary embodiments described herein pertain to inversion of geophysical field data with meaningful constraints on reservoir properties.

BACKGROUND

This section is intended to introduce various aspects of the art, which may be associated with exemplary embodiments of the present technological advancement. This discussion is believed to assist in providing a framework to facilitate a better understanding of particular aspects of the technological advancement. Accordingly, it should be understood that this section should be read in this light, and not necessarily as admissions of prior art.

An important goal of geophysical prospecting is to accurately image subsurface structures commonly referred to as reflectors. Seismic prospecting, for example, is facilitated by obtaining raw seismic data during performance of a seismic survey. During a seismic survey, seismic energy can be generated at ground or sea level by, for example, a controlled explosion (or other form of source, such as vibrators), and delivered to the earth. Seismic waves are reflected from underground structures and are received by a number of sensors/receivers, such as geophones. The seismic data received by the geophones is processed in an effort to create an accurate mapping of the underground environment. The processed data is then examined with a goal of identifying geological formations that may contain hydrocarbons (e.g., oil and/or natural gas).

Controlled-source electromagnetic ("CSEM") geophysical surveys use man-made sources to generate electromagnetic fields to excite the earth, and deploy receiver instruments on the earth's surface, on the seafloor, in the air, or inside boreholes to measure the resulting electric and magnetic fields, i.e., the earth's response to the source excitation. By way of example, a vessel can tow a submerged CSEM transmitter over an area of the seafloor. The electric and magnetic fields measured by receivers are then analyzed to determine the electrical resistivity of the earth structures beneath the seafloor.

Magnetotelluric ("MT") geophysical surveys exploit naturally occurring variations in the earth's electromagnetic fields. Receivers are deployed on the earth's surface, on the seafloor, in the air, or inside boreholes to measure the vector components of either the electric field, or the magnetic field, or both over a length in time of this natural variation. Transfer functions between the measured fields are estimated which are then analyzed to determine electrical resistivity of the earth structure beneath the plane of measurement.

One manifestation of mathematical inversion is the process by which observations, or data, are converted into estimates of a model of interest. For example, in geophysics these observations may be electric and magnetic field measurements at the earth's surface, and the model of interest is the distribution of electrical resistivity within the subsurface.

The physical process that connects a subsurface physical property (velocity, density, or impedance for seismic data and electrical resistivity for electric and magnetic field measurements) and the model to the recorded field data can be represented by a non-linear set of equations. As such, the inversion algorithm used must be chosen from a family of non-linear optimizations. Two of the non-linear optimization styles, most commonly used in geophysics are Non-linear Conjugate Gradient (NLCG), a first-order approach, and Gauss-Newton, a second-order approach (e.g., Newman & Alumbaugh, 2000, *Geophys. J. Intl.*, Vol. 140, pp. 410-424; D. Avdeev, 2005, *Surveys in Geophysics*, Springer, 26, pp. 767-799; Hu et al., 2011, *Geophysical Prospecting*, EAGE, 59, pp. 477-491; Egbert, 2012, *Geophys. J. Intl.*, 189, pp. 251-267).

There is a problem in regards to the non-uniqueness of geophysical data, in particular, that of seismic amplitude-versus-offset (AVO) variations. In short, the term non-uniqueness means there are an infinite number of rock property combinations that give rise to the same measured AVO response. Non-uniqueness can be caused by a number of factors, such as non-linearity between the input parameters (rock properties) and the output data (seismic AVO), as well as some level of incompleteness and imprecision of the measurement—that is, the data sampling will inevitably be finite and corrupted by noise, or events not predicted by our physical model. The reason non-uniqueness is a problem in the prospecting for hydrocarbons is that remote geophysical data is relied upon, like seismic AVO measured at the earth's surface, to predict the rock properties, like porosity, clay content, and water saturation, that would be encountered at a remote depth within the earth before investing large sums of money to drill down and directly sample the earth's subsurface. Non-uniqueness prohibits an exact prediction because, in essence, there is no single "right" answer—the surface-based data will always support an infinite variety or rock properties at some remote depth within the earth.

The fact that the number of feasible rock property instances (models) is infinite does not require that they span the full range of possible values. For example, suppose there are only two data points with which to predict someone's age. Assuming this person's parentage is exactly known, we have the date their parents first met, Jan. 1, 1950, and the date of the first death of one of the parents, Jan. 1, 1990. On Jan. 1, 2017, there are an infinite number of possibilities for this person's age: 60 years; 60 years, 2 months; 60 years, 2 months, 5 days; 60 years, 2 months, 5 days, 3 hours; and so on. Yet the "data" tell us affirmatively (ignoring noise for now) that this person is no older than 67 years, and no younger than 27 years. One would say, the person's age is bound between 27 and 67 years. Thus, non-unique data are not doomed. When the data can produce bounds on a quantity that are narrower than the previous knowledge (for the age example, these bounds might be between 0 years and the age of the human species), they deliver value.

The current state-of-the-art approaches to delivering reservoir property uncertainty estimates either make inaccurate approximations, or are too computationally expensive to be of practical use. Examples of the former start with "most likely" models of porosity and volume of shale produced by a standard deterministic least-squares inversion (e.g., Gouveia & Scales, 1998; Buland & Omre, 2003). Then uncertainty estimates are made either by making a linear approximation of the fitting function around the inversion's final solution, or by repeating the inversion process with different choices of regularization or prior constraints. The linear error-propagation method is an inaccurate approximation for non-linear systems or even linear systems that are rank-deficient or whose parameters have non-Gaussian a priori bounds. While the method of varying regularization and prior scenarios is useful, it is nonetheless subjective and comes with no guarantee that the full non-uniqueness of the solution space is explored. Examples of the latter (computationally expensive methods) involve stochastic inversion using Markov-chain Monte Carlo (MCMC) sampling (e.g., Eidsvik et al., 2004; Rimstad & Omre, 2010). These, in theory, will provide an accurate estimate of each model parameter's posterior probability distribution but take many thousands of iterations of synthetic data calculation to converge, making them impractical for large geophysical data sets. In addition, we argue that a full posterior probability distribution for every element of the model parameterization is more information than is needed to make a decision regarding the subsurface physical properties. The present technological advancement is able to significantly reduce the computation cost by rigorously probing the uncertainty in a single scalar metric.

SUMMARY

A method including: obtaining geophysical data for a subsurface region; generating, with a computer, at least two subsurface property models of the subsurface region for at least two subsurface properties by performing an inversion that minimizes a misfit between the geophysical data and forward simulated data subject to one or more constraints, the inversion including generating updates to the at least two subsurface property models for at least two different scenarios that both fit the geophysical data with a same likelihood but have different values for model materiality, with the model materiality being posed as an equality constraint in the inversion, wherein the model materiality is a functional of model parameters that characterize hydrocarbon potential of the subsurface region; analyzing a geophysical data misfit curve or geophysical data misfit likelihood curve, over a predetermined range of values of the model materiality to identify the at least two subsurface property models that correspond to a high-side and low-side, respectively, for each of the at least two subsurface properties, with the high-side and low-side quantifying uncertainties in the subsurface properties; and prospecting for hydrocarbons in the subsurface region with the at least two models that correspond to the high-side and the low-side for each of the at least two subsurface properties.

In the method, the model materiality can weigh porosity of a hydrocarbon reservoir in the subsurface region against shale content of the hydrocarbon reservoir.

In the method, the model materiality can further weigh the porosity of the hydrocarbon reservoir against water saturation.

In the method, the inversion can be constrained by a predetermined range of values for the model materiality.

In the method, the model materiality can be a linear functional of model parameters that characterize hydrocarbon potential of the subsurface region.

In the method, the porosity, the shale content, and the water saturation can be determined for a predetermined depth range in the subsurface region.

In the method, the geophysical data can be at least one of seismic, electromagnetic, or gravity.

In the method, the at least two subsurface properties are Vshale and porosity.

In the method, the inversion can be least squares inversion.

In the method, the least squares inversion can be bounded variable least squares inversion.

In the method, the least squares inversion can be non-negative least squares inversion.

In the method, the geophysical data can be one or more of P-wave velocity Vp, S-wave velocity Vs, Vp/Vs, impedance, density, or resistivity.

In the method, the geophysical data can be one or more of seismic stacks or gathers.

In the method, the geophysical data can be controlled source electromagnetic data.

The method can further include obtaining probability density functions for rock properties from well-logs or cores, wherein the probability density functions can be included as the one or more constraints.

In the method, three-dimensional information can be included in the one or more constraints.

In the method, a rock physics model, calibrated from well logs, can be included in the one or more constraints.

In the method, the geophysical data can be synthetic data, and the prospecting for hydrocarbons can include planning a geophysical acquisition based on the high-side and low-side generated with the synthetic data.

In the method, the model materiality is a functional that can be a sum of an average for each of a plurality of model parameters that characterize hydrocarbon potential of the subsurface region.

The method can further include generating subsurface images of the at least two subsurface property models that correspond to a high-side and low-side, and based at least in part on the subsurface images, estimating uncertainty for subsurface properties that indicate a presence or absence of hydrocarbon deposits in a subterranean geologic formation.

In the method, the three-dimensional information included in one or more constraints can be dip and azimuth derived from seismic data.

BRIEF DESCRIPTION OF THE DRAWINGS

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles.

DETAILED DESCRIPTION

Figure 1:
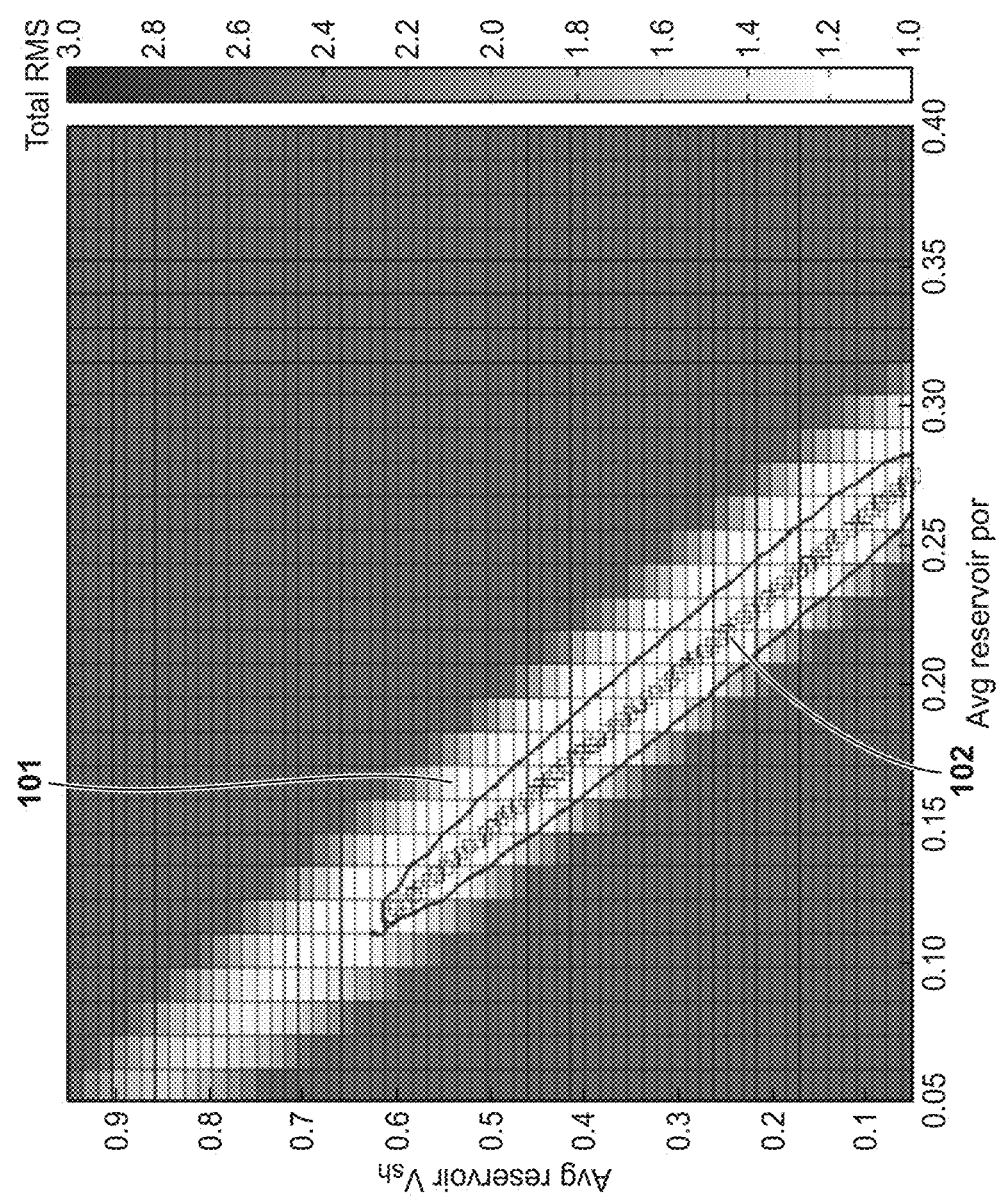
FIG. 1 illustrates computational savings provided by the present technological advancement.

Exemplary embodiments are described herein. However, to the extent that the following description is specific to a particular embodiment, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The present technological advancement is able to determine the bounds on a unique, commercially-relevant, hydrocarbon-reservoir property that are provided by geophysical data. Geophysical data can include any combination of P-wave (pressure wave) velocity Vp, S-wave (shear wave velocity) velocity Vs, the ratio Vp/Vs, shear wave and/or pressure wave impedance, density, or resistivity. Moreover, the geophysical data can further be one or more of seismic stacks or gathers with any combination of Vp, Vs, Vp/Vs, impedance, density, or resistivity.

The present technological advancement can provide both low-side and high-side cases for a subsurface property that is consistent with the seismic data, by which exploration, development, and/or production decisions about the hydrocarbon discovery can be implemented. By delivering the extreme, yet valid cases for the subsurface property, the unavoidable uncertainty in the data is appreciated and decision-making that is anchored to a single scenario can be avoided. Operating while tightly adhered to a single predicted scenario, when many are possible, which is always the case with real data, has led to costly dry wells and inefficient exploration for hydrocarbons.

The subsurface may be represented by a large number of parcels (or volumetric elements) of material, usually scaled to a size below the spatial resolution of seismic data. Each parcel of material can be characterized by multiple rock properties which affect the behavior of seismic waves. The examples discussed herein will focus on the rock properties of porosity ($\phi$) and volume fraction of shale ($V_{sh}$ or Vshale). An obvious extension of a rock/fluid description is water saturation ($S_w$). To solve for the range of possible values (the bounds) for every rock property of every parcel is computationally impractical (at least, for now). Furthermore, for many commercial decisions, knowing the range of property values that each minute parcel may take is not necessary. In fact, it is usually the aggregate value of a rock property over the full-thickness of a target reservoir that is salient to exploration, development, and/or production decisions, e.g., total hydrocarbon volume.

The present technological advancement can provide meaningful bounds on a reservoir property, in light of data non-uniqueness and uncertainty. The objective of Saltzer and Finn (2006) can be adopted, that is: find the best- and worst-case reservoir scenarios, from an economic perspective, which are both consistent with available data. The present technological advancement can adapt inversion techniques to find these extreme models which are consistent with data. Examples described herein will make use of seismic AVO data (angle-gathers), and a low-frequency velocity trend from FWI or tomography (recall, other types of geophysical data are equally applicable in this framework, but simply not discussed in this example). The present technological advancement can add seismic rock-property constraints from facies clustering of well-log data. These well-log constraints may be incorporated as, what we will call, model priors. The rock properties which will be utilized as model parameters, because they generate the majority of the seismic response, are porosity ($\phi$) and volume fraction of shale ($V_{sh}$). (The equally important rock/fluid property of water saturation ($S_w$) can easily be added to the metric discussed below.) Quite simply, the best-case for a reservoir, in terms of economic potential, is one with maximum total (aggregate value over full-thickness of the target reservoir) porosity and minimum total (aggregate value over full-thickness of the target reservoir) volume of shale (as shale is not conventionally deemed a reservoir facies). The worst-case is obviously one with minimal total porosity and maximal total volume of shale. As stated before, the economic potential is proportional to the aggregate or sum of rock properties across the full reservoir. The present technological advancement introduces a measure of the reservoir's hydrocarbon potential, which is referred to as materiality, $\lambda$, defined as the difference between reservoir sums of $\phi$ and $V_{sh}$, $$\lambda = \alpha - \beta, \quad (1)$$

where, $$\alpha = \frac{\int_R \phi \, dz}{\Delta z} \text{ and } \beta = \frac{\int_R V_{sh} \, dz}{\Delta z}. \quad (2)$$

For a 1-dimensional (trace-by-trace) inversion, R is some depth interval of potential hydrocarbon interest, e.g. a stack of target reservoirs, and $\Delta z = \int_R dz$. For 3-dimensional (3D) inversion, region R may be some volume of potential hydrocarbon interest, such that the denominators in (2) may be defined as $\Delta v = \int_R dx\, dy\, dz$. To find the best-case model, the present technological advancement can include performing an inversion which maximizes $\lambda$ while producing a reasonable fit to the data, whereas for the worst-case model, the same inversion technique can be used to minimize $\lambda$ while producing the same reasonable fit to the data. Note that by their nature, upscaled properties $\alpha$ and $\beta$ are non-negative, and may be formulated as a weighted average such that their most naive a priori bounds are [0, 1]. Note that under this preferred normalization the possible range of materiality is also bound by [−1, 1]. With this range of values, "materiality" might be a misnomer, as $\lambda=0$ does not necessarily represent a reservoir of no material value. For example, a reservoir with average porosity of 0.4 and average volume-fraction of shale of 0.4 would have a zero materiality by (1). Therefore, it might be better to shift and renormalize the quantity of materiality, such that zero materiality truly aligns with an un-economic reservoir. Thus, one could instead write a new materiality metric $$\hat{\lambda} = \frac{\alpha - \beta + \kappa}{\gamma}, \quad (1b)$$

where $\kappa$ is some constant related to the minimum possible value of $\lambda$ from (1), and $\gamma$ is another constant related to the maximum possible value of the numerator from (1b), such that the range of the shifted and normalized $\hat{\lambda}$ of (1b) is now [0,1]. For example, assuming more realistic a priori bounds of $0.05 \leq \phi \leq 0.4$ and $0 \leq V_{sh} \leq 1$, we see the range of materiality must be $-0.95 \leq \lambda \leq 0.4$. Therefore, if we choose $\kappa = 0.95$ and $\gamma = 1.35$, we find the range of the shifted and normalized materiality, $0 \leq \hat{\lambda} \leq 1$. These shift and normalization constants are purely for ease of communication of the meaning of materiality and do not affect the optimization problem, so they are neglected in the remaining text.

The data-fitting function (e.g., forward simulator) whether linear or non-linear, can be written as G(m) where we write the model vector as $$m = \begin{bmatrix} \phi \\ V_{sh} \end{bmatrix}. \tag{3}$$

An inversion scheme useable with the present technological advancement can be iterative, even when G(m) is linear. Each iteration seeks to produce a reasonable fit to the data, while forcing $\lambda$ to a specific value. Then, over many iterations, the value imposed on $\lambda$ is changed and the present technological advancement can scan for two points at which the inversion can no longer produce a reasonable fit to the data: one, on the low-side of $\lambda$, which indicates the worst-case model, while the other, on the high-side of $\lambda$, indicates the best-case model. The objective function within a single iteration, using the 1-dimensional (1D) problem as an example, can be written as $$\min \| W[G(m) - d] \|_2^2 \quad \text{s.t.} \quad \lambda = \frac{1}{\Delta z} \left( \int_R \phi dz - \int_R V_{sh} dz \right), \tag{4}$$
$$b_{l_\phi} \leq \phi \leq b_{u_\phi}, \text{ and } b_{l_V} \leq V_{sh} \leq b_{u_V}$$

where d is the vector of data and W is a data weighting matrix, which for the most simplistic case of completely uncorrelated data, has inverse standard deviations of the data along the diagonal. W may also be chosen such that $C_d^{-1} = W^T W$, where $C_d$ is the covariance matrix of the data, d. Equation 4 also introduces more flexible upper and lower a priori bounds, $b_u$ and bl, respectively.

For a linear data simulator, G (m), the scheme may efficiently proceed by producing a curve of minimal standardized-chi-squared misfit, $\chi_{min}^2$, as a function of the imposed value of $\lambda$. The calculation of this curve in block-matrix form can be written as $$m_{min}(\lambda) = \arg \min_{\substack{b_{l_\phi} \leq \phi \leq b_{u_\phi} \\ b_{l_V} \leq V_{sh} \leq b_{u_V}}} \left\| \begin{bmatrix} WG_\phi & WG_{V_{sh}} \\ Hu^T & -Hu^T \end{bmatrix} \begin{bmatrix} \phi \\ V_{sh} \end{bmatrix} - \begin{bmatrix} Wd \\ H\lambda \end{bmatrix} \right\|_2^2. \tag{5a}$$

Here, a value for materiality has been imposed by simply adding a heavily weighted constraint alongside the data constraints; maintaining generality for the moment, data constraints may be any number of seismic, electromagnetic, well-log, core measurement, etc. which may be approximated by a linear simulator. For each new value of 1 for which the misfit curve is computed, the Bounded Variable Least Squares (BVLS) problem above must be solved (Stark & Parker, 1995). The symbol u is a column vector which approximates the weighted integrals of $\phi$ and $V_{sh}$ over R, i.e., the calculation of $\alpha$ and $\beta$. The symbol H is a large scalar weight which ensures that the imposed value of $\lambda$ is met by the model parameters $\phi$ and $V_{sh}$.

Alternatively, a more rigorous and numerically stable way to impose an equality constraint on $\lambda$ would be to project the data-misfit objective into the null-space of the materiality equality constraint. First we write the equality constraint in the latter part of (4) as $Em = \lambda$, where $E = [u^T \; -u^T]$. A reduced-rank model vector can be introduced, $$m = \overline{m} + V_2 y_2, \tag{5b}$$

where we have used a Singular Value Decomposition (SVD) of E defined as $$E = USV^T, \tag{5c}$$

with $$V = [V_1 V_2], \tag{5d}$$

and $$\overline{m} = VS^+ U^T \lambda, \tag{5e}$$

where $S^+$, signifies the pseudo-inverse of S. Recall that for the SVD, matrix S is a rectangular diagonal matrix with non-negative real "singular values" along the diagonal. Then the columns of the unitary matrix U are the "left-singular vectors" of E, and the unitary matrix V are the "right-singular vectors" of E. In (5d), we have split V such that $V_1$ contains the first r columns, and $V_2$ the remaining columns, where r represents the rank of E, which may be determined by counting the singular values in S which are greater than some threshold. With this recasting of variables, the objective function in (4) can be solved over a range of $\lambda$ with $$m_{min}(\lambda) = \arg \min_{\begin{bmatrix} V_2 \\ -V_2 \end{bmatrix} y_2 \geq \begin{bmatrix} b_l - \overline{m} \\ \overline{m} - b_u \end{bmatrix}} \| W(GV_2 y_2 - \hat{d}) \|_2^2 \tag{5f}$$

where $\hat{d} = d - G\overline{m}$. The problem written as (5f) is known as Least Squares with Inequality constraints (LSI), which is solved by casting it as a Non-negative Least Squares problem (NNLS). The book "Solving Least Squares Problems", by Lawson & Hanson (1974) provides all the background detail for equations 5a-5f in its $23^{rd}$ chapter.

The curve achieved with either (5a) or (5f) can be used to plot the likelihood function of the data misfit for each model, defined as $$l(\lambda) = \exp(-\chi_{min}^2) = \exp(-\| W[G(m_{min}(\lambda)) - d] \|_2^2), \tag{6}$$

over the possible range of materiality, which provides a relative measure of posterior probability for each value of reservoir materiality, assuming uniform prior probability. The flat top of the likelihood function (see, FIG. 4G) can be seen as a projection of the data's null-space onto the metric of materiality. This signifies the range of $\phi$ and $V_{sh}$ combinations that result in numerically equivalent fits to the seismic data. The models corresponding to the end-members of that range in $\lambda$ which produce a sufficient misfit likelihood, provide the best- and worst-case scenarios in terms of economics of a reservoir. The level of "sufficient" misfit likelihood will be selected by the user based on the level of confidence they wish to have in the resulting bounding models.

The likelihood curve of (6) can be thought of as the inverse of the data misfit curve. Thus, while this example proceeds to utilize the likelihood curve in the present example, the data misfit curve could be used instead.

Another important reservoir property, water saturation, $S_w$, has been excluded for the moment because seismic data alone are weakly sensitive to it, but materiality could be defined as $\lambda = \alpha - \beta - \omega$, or $$\hat{\lambda} = \frac{\alpha - \beta - \omega + \kappa}{\gamma},$$  (5)

and the process used with $\omega$ representing some aggregate sum of water saturation, such as $$\omega = \frac{\int_R S_w dz}{\Delta z}.$$  (7)

Note that since cumulative water saturation is a detriment to the economic viability of a reservoir, it is subtracted in the materiality equation, just like the cumulative volume of shale.

While materiality has been discussed as being defined by petrophysical parameters relating to clastics, it can be defined differently for other lithologies, such as carbonates. In general, materiality can be defined as the sum of relevant reservoir parameters, where properties which when increased lead to greater economic value when hydrocarbons are present in the reservoir, are added with a positive sign, and conversely, parameters which decrease the economic value when hydrocarbons are present in the reservoir if they are increased, are added with a negative sign. By defining materiality as a sum of average parameters, the equality constraint can be kept linear. It is possible to use nonlinear constraints, such as hydrocarbon pore thickness, in the same way. However, nonlinear constraints need more iterations to be met, increasing the computational burden, and are thus less desirable. Furthermore, once low and high side models from a materiality search are selected based on some misfit likelihood, it is possible to compute any desired parameter combination, linear or non-linear, from the low and high side models.

The present technological advancement can be extended to non-linear data simulators, yet in this case it is more expensive to get the full likelihood curve over the whole range of $\lambda$. It is more efficient then to perform a sparse line-search over $\lambda$ seeking to converge only to the upper and lower intersections between the misfit curve $\chi_{min}^2(\lambda)$ and a chosen misfit threshold (i.e., one with the "sufficient" level of misfit likelihood), very similar to the approach introduced by Constable et al. (1987).

Returning to the linear data-simulator case, other data or prior knowledge may be included by adding more rows to the block-matrix formulation. Say, for example, one knows the prior probability density function for the $i^{th}$ model element is Gaussian with means and standard deviations, $\mu_i$ and $\sigma_i$, respectively. Then, (5a) can be rewritten as $$m_{min}(\lambda) = \arg \min_{\substack{b_{l_\phi} \leq \phi \leq b_{u_\phi} \\ b_{l_V} \leq V_{sh} \leq b_{u_V}}} \left\| \begin{bmatrix} WG_\phi & WG_{V_{sh}} \\ R_\phi & R_{V_{sh}} \\ Hu^T & -Hu^T \end{bmatrix} \begin{bmatrix} \phi \\ V_{sh} \end{bmatrix} - \begin{bmatrix} Wd \\ R\mu \\ H\lambda \end{bmatrix} \right\|_2^2,$$  (8a)

where $R=[R_\phi \; q \; R_{V_{sh}}]$, or rewrite (5f) as $$m_{min}(\lambda) = \arg \min_{\begin{bmatrix} V_2 \\ -V_2 \end{bmatrix} y_2 \geq \begin{bmatrix} b_l - \overline{m} \\ \overline{m} - b_u \end{bmatrix}} \| FV_2 y_2 - \hat{g} \|_2^2,$$  (8b)

where $$F = \begin{bmatrix} WG_\phi & WG_{V_{sh}} \\ R_\phi & R_{V_{sh}} \end{bmatrix},$$

and $$\hat{g} = \begin{bmatrix} Wd \\ R\mu \end{bmatrix} - F \overline{m}.$$

If the model parameters are uncorrelated under the prior information, the matrix R is a diagonal one with $\sigma_i^{-1}$ along its diagonal. With correlation, R can be defined by the prior covariance matrix of the model parameters, $C_m$, such that $C_m^{-1} = R^T R$.

It is straightforward to add other types of regularization typically used, e.g. first derivative smoothing, as another row-block of constraints to the optimized systems described herein. This additional regularization can be added with a fixed weight or it can be searched over the weight as described in Constable et al. (1987).

The results of previous iterations of adjacent seismic traces can be used to influence the next iteration. For example, after one iteration on all traces, the priors for each trace at the next iteration may be derived by a 3D-smoothed (laterally smoothed) model volume (collection of all traces) from that previous iteration. Therefore, even though it is a 1D (trace-independent) inversion, each trace receives information from the neighboring traces in between iterations, and that is incorporated into their priors. For example, three-dimensional information included in one or more constraints can be dip and azimuth derived from seismic data.

The preceding approach assumes each model element has a prior probability distribution that is characterized by a single Gaussian. The following provides an explanation regarding how (8a-8ba) were arrived at. It employs the method of maximum a posteriori probability (MAP). As the name implies, one can seek to find the model which maximizes the posterior probability given by $$P(m|d) \propto P(d|m)P(m) = P(d|m)\Pi_{i=1}^N = P(m_i).$$  (9)

$m_i$ can be written to represent a single element of the vector m, having N elements. Also, P(d|m), is the data likelihood, which when assuming the errors in the data are Gaussian distributed, is given by (6). When the model prior probability, P(m), is uniform, the MAP solution given the equality constraint on materiality is found by (4) & (5a or 5fa). These are the result of maximizing the logarithm of (9), where it is noted that the argument maximizing the logarithm of a quantity is the same as the argument maximizing the original quantity. Now, if P(m) is a product of Gaussians, i.e., each element of m is Gaussian-distributed, then it can easily be shown that maximizing the logarithm of (9) given the equality constraint on materiality is achieved by (8a or 8ba). The method of (8a or 8ba) may be used iteratively for a fixed $\lambda$, where the shape parameters of the Gaussian prior distributions for $m_i$, i.e., $\mu_i$ and $C_m$, are updated between iterations by an external process (see, U.S. patent application 62/429,475, filed Dec. 2, 2016, the entirety of which is hereby incorporated by reference, for a discussion of updating distribution of model parameters). Instead of performing one optimization with a fixed prior m, multiple iterations of optimization are performed for each fixed $\lambda$. After each optimization step k there is a learning step, during which the prior for the next iteration $m_{k+1}$ is updated with the resulting parameter estimates $\phi_k$ and $V_{sh_k}$ from the current optimization. This is the approach taken by Expectation Maximization (EM) algorithms. For example, shape parameters of the prior distributions may be updated after each iteration by taking into account the previous iteration's result for the models at adjacent traces. In this way, the prior distribution is used to expose an iterative trace-by-trace (i.e., 1D) inversion to 3D spatial information.

Alternatively, one could treat the prior probability distribution function for each $m_i$ as a sum of Gaussians. For our example, one could employ one Gaussian for each seismic facies identified in multi-dimensional well-log space. Seeking the MAP solution as before could create new constraints in the block-matrix system which are now non-linear, due to the logarithm of a sum of Gaussians. Adding now the possibility that the data simulator, G(m), is also nonlinear, the minimum misfit objective for the $t^{th}$ iteration can be rewritten as $$\min_{0 \leq m_{(t+1)} \leq 1} \left\| \begin{bmatrix} W \frac{\partial G}{\partial m_{(t)}} \\ \frac{\partial L}{\partial m_{(t)}} \\ H u^T \end{bmatrix} [m_{(t+1)}] - \begin{bmatrix} W\{d - G(m_{(t)}) + \frac{\partial G}{\partial m_{(t)}} m_{(t)}\} \\ \frac{\partial L}{\partial m_{(t)}} m_{(t)} - L(m_{(t)}) \\ H\lambda \end{bmatrix} \right\|_2^2, \quad (10)$$

or $$\min_{\begin{bmatrix} V_2 \\ -V_2 \end{bmatrix} y_{2(t+1)} \geq \begin{bmatrix} b_l - m \\ m - b_u \end{bmatrix}} \left\| \begin{bmatrix} W \frac{\partial G}{\partial m_{(t)}} V_2 \\ \frac{\partial L}{\partial m_{(t)}} V_2 \end{bmatrix} [y_{2(t+1)}] - \begin{bmatrix} W\{d - G(m_{(t)}) + \frac{\partial G}{\partial m_{(t)}} V_2 y_{2(t)}\} \\ \frac{\partial L}{\partial m_{(t)}} V_2 y_{2(t)} - L(m_{(t)}) \end{bmatrix} \right\|_2^2, \quad (11b)$$

where it can be shown that the MAP solution requires $$L(m) = \sqrt{\Sigma_{i=1}^N \log(P(m_i)^{-1})}, \quad (12)$$

with $L^2$ representing the logarithm of total prior probability, N as the number of model elements, and i the model element index. The prior probability distribution for each model element, no longer a single Gaussian, can be given by $$P(m_i) = \frac{1}{D} \sum_{k=1}^{D} \frac{1}{\sqrt{|2\pi C_k|}} \exp\left(-\frac{1}{2}(m_i - \mu_k)^T C_k^{-1}(m_i - \mu_k)\right), \quad (13)$$

where D is the number of facies, and k the facies index. Subscripted indices in parentheses, t, relate to the iteration number, since with non-linear inversion the solution is reached only by convergence over multiple iterations, where the Jacobian matrices $$\frac{\partial G}{\partial m_{(t)}} \text{ and } \frac{\partial L}{\partial m_{(t)}},$$

are computed from the previous iteration's model result. While the Jacobian matrix $$\frac{\partial G}{\partial m_{(t)}}$$

will depend the on the chosen rock-physics model, the $i^{th}$ column of the Jacobian matrix of the log of a sum of Gaussians can be computed as $$\frac{\partial L}{\partial m_{(t)}} = -\frac{1}{2} \frac{1}{L(m_i)} \frac{1}{P(m_i)} \frac{\partial P}{\partial m_i}, \quad (13)$$

where $$\frac{\partial P}{\partial m_i} = -\frac{1}{D} \Sigma_{k=1}^D \frac{1}{\sqrt{|2\pi C_k|}} \exp\left(-\frac{1}{2}(m_i - \overline{m}_k)^T C_k^{-1}(m_i - \overline{m}_k)\right)(m_i - \overline{m}_k)^T C_k^{-1}. \quad (14)$$

Yet another example of solving for minimum and maximum reservoir-interval materiality consistent with a set of data, derives from the assumption that the underlying data errors and model priors are uniformly distributed as opposed to Gaussian distributed. For example, with the data errors uniformly distributed between $\pm\sigma$, the materiality bounds can be found by optimizing the following two systems with inequality constraints:

$$\min_{\begin{bmatrix} F \\ -F \\ I \\ -I \end{bmatrix} m \geq \begin{bmatrix} g-\sigma \\ -g-\sigma \\ b_l \\ -b_u \end{bmatrix}} \| Em - \lambda_{min} \|_2^2 \quad (15)$$

where $\lambda_{min}$ is the minimum possible materiality based on the model priors, and, $$\min_{\begin{bmatrix} F \\ -F \\ I \\ -I \end{bmatrix} m \geq \begin{bmatrix} g-\sigma \\ -g-\sigma \\ b_l \\ -b_u \end{bmatrix}} \| Em - \lambda_{max} \|_2^2$$

where $\lambda_{max}$ is the maximum possible materiality based on the model priors. Recall that $m=[\phi \ V_{sh}]^T$, and $E=[u^T \ -u^T]$, with Em approximating the materiality integral (porosity minus volume-shale) over the reservoir interval. Also, this approach has introduced $$g = \begin{bmatrix} Wd \\ R\mu \end{bmatrix},$$

a vector of standardized data and prior means; this defines $\sigma$ in units of standard deviations, instead of the absolute units of the data and priors.

One benefit of this final example is that no line search is necessary; the minimum and maximum materiality are found in only two applications of NNLS. The other benefit is that the inversion is forced to fit the whole vector of data somewhat uniformly, not allowing large misfit in one region at the expense of another. The corollary to that is that this model assumed for the data errors allows no flexibility for outliers.

The present technological advancement can improve computational efficiency. FIG. 1 illustrates a plot of average reservoir Vshale vs. average reservoir porosity. Each box corresponds to an inversion with an equality constraint for average porosity and Vshale. Contour 101 is the root mean square (RMS) equal to one contour (total RMS misfit for this example). The boxes 102, within contour 101, represent all the models from the materiality search with a total RMS less than or equal to one. Use of the materiality constraint of the present technological advancement can successfully recover the end members (upper and lower bounds for the geophysical parameters) using a one dimensional (1D) search (in the direction of the boxes 102) instead of a two dimensional (2D) search over the entirety of the space illustrated in FIG. 1. In effect, the present technological advancement can improve efficiency by not doing all of the inversions necessary to fill in all the colored cells in FIG. 1; but rather only doing the inversions in a range of values for materiality.

Figure 2A:
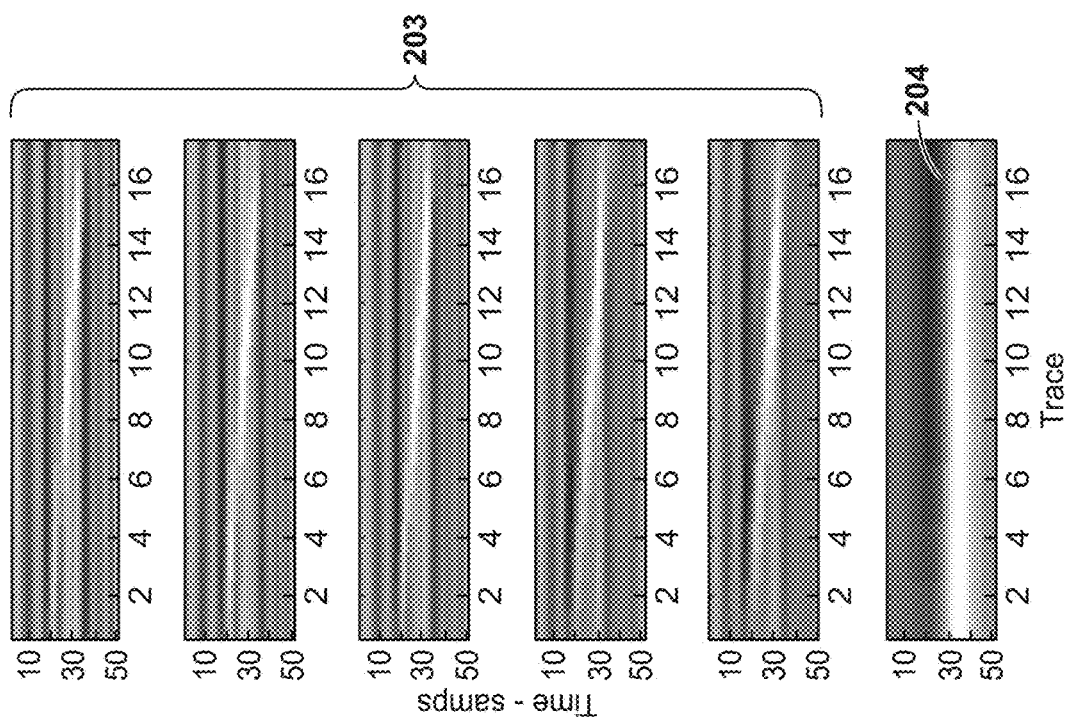
FIGS. 2A, 2B, and 2C illustrate exemplary data.
Figure 2B:
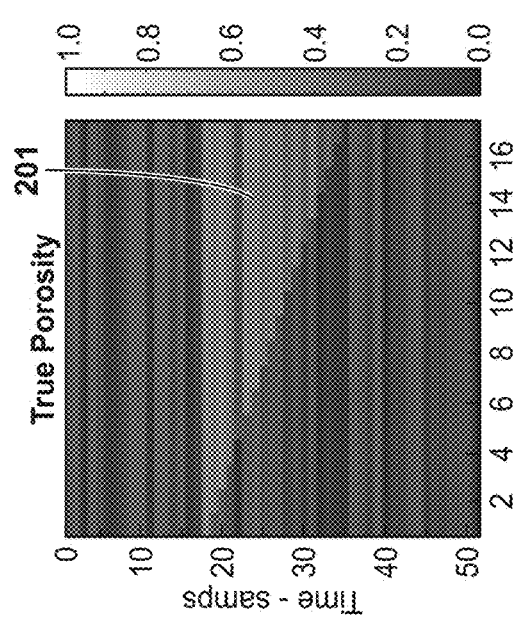
Figure 2C:
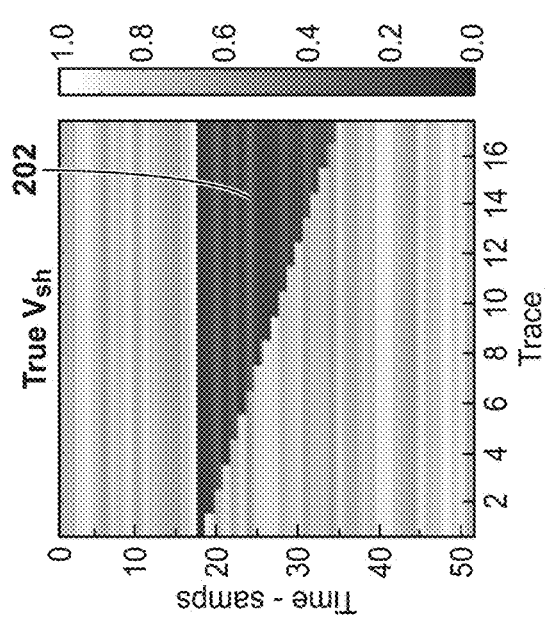

FIG. 2A illustrates a depth section of a "true" reservoir and is given by wedge 201 for "True Porosity" FIG. 2B illustrates a depth section of a "true" reservoir and is given by wedge 202 for "True $V_{sh}$". FIG. 2C illustrates the corresponding data, in the form of six angle gathers 203 and a full wavefield inversion (FWI) derived low frequency model stacked on top of each other. Each of FIGS. 2A-2C are plotted in coordinates of seismic time sample (vertical) and seismic trace (lateral). The data are noise free, but up to 25% random geologic variation in the vertical properties of the model was added, as can be seen with the lateral striping.

Figure 3:
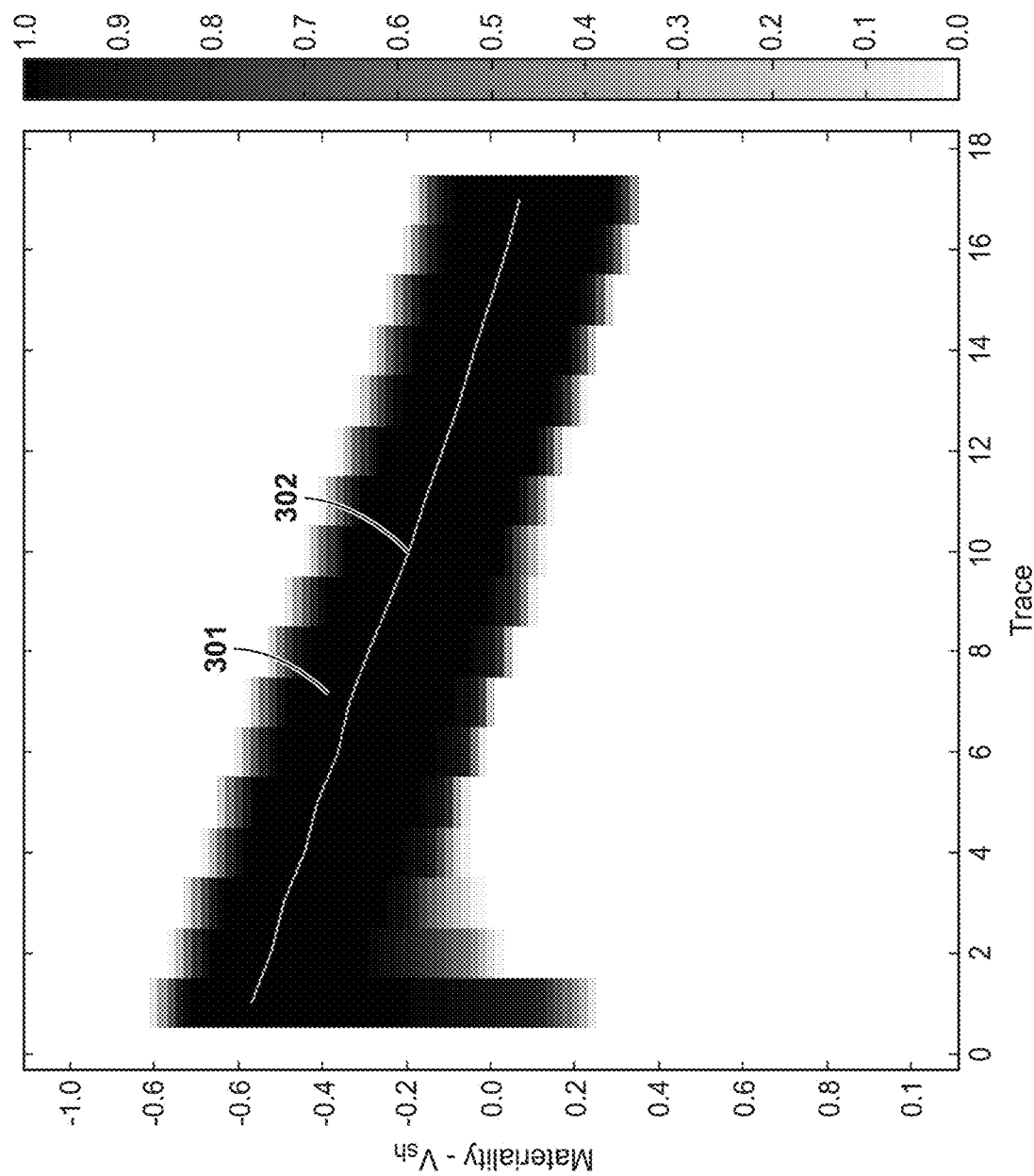
FIG. 3 illustrates exemplary likelihood curves.

FIG. 3 illustrates likelihood curves from equation (6) for each value of materiality resulting from the solutions of equation (5a). The range of materiality where likelihood is close to 1 (region 301) signifies the uncertainty in the data; many different values of materiality can produce nearly the same fit to the data. This range always inscribes the "true value" (line 302), which is known because this is a synthetic data example. Such inscription is a necessary but not sufficient sign of validity for any uncertainty estimation procedure. Also note that as the reservoir wedge becomes thin, traces 1-3, the uncertainty in materiality is greater owing to a wider range which achieves a high likelihood. This is due to the interference effects between the wavelet reflections off the top and base of the reservoir. Once the reservoir is thick enough, the interference vanishes, and the uncertainty in materiality stabilizes to a value driven more by the non-uniqueness of the rock physics.

Figure 4A:
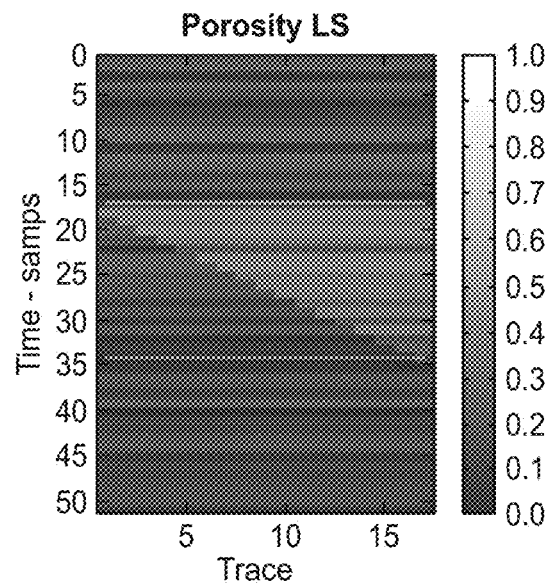
FIGS. 4A and 4B are the models for porosity relating to solutions extracted at the low-side and high-side, respectively.
Figure 4B:
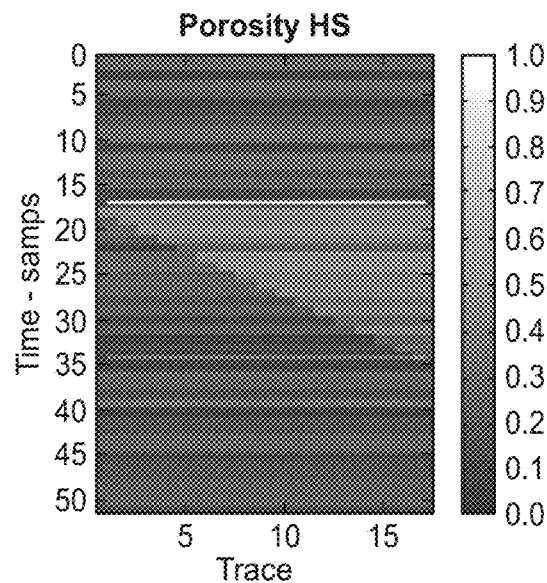
Figure 4C:
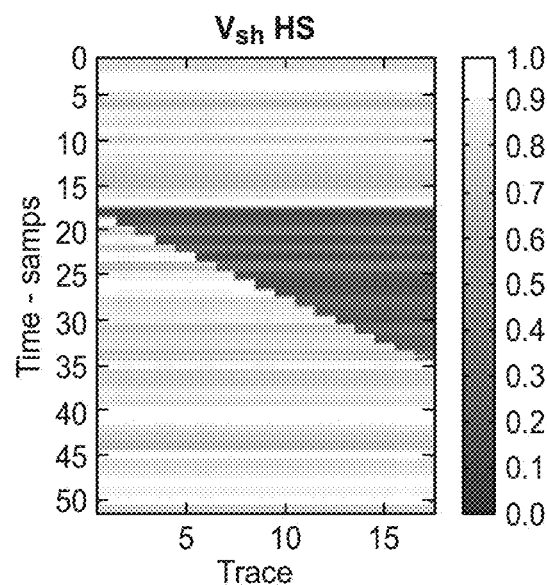
FIGS. 4C and 4D are the models for Vshale relating to solutions extracted at the low-side and high-side, respectively.
Figure 4D:
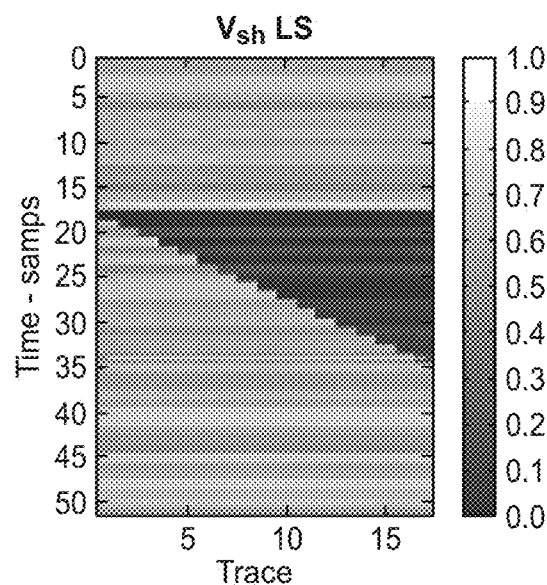

FIGS. 4A and 4B are the models for porosity relating to solutions extracted at the low-side (LS) and high-side (HS), respectively, of the likelihood vs. materiality curve in FIG. 3. Since the seismic data were noise-free, the likelihood threshold was selected to be very high (>0.999). FIGS. 4C and 4D are the models for Vshale relating to solutions extracted at the low-side and high-side, respectively.

Figure 4G:
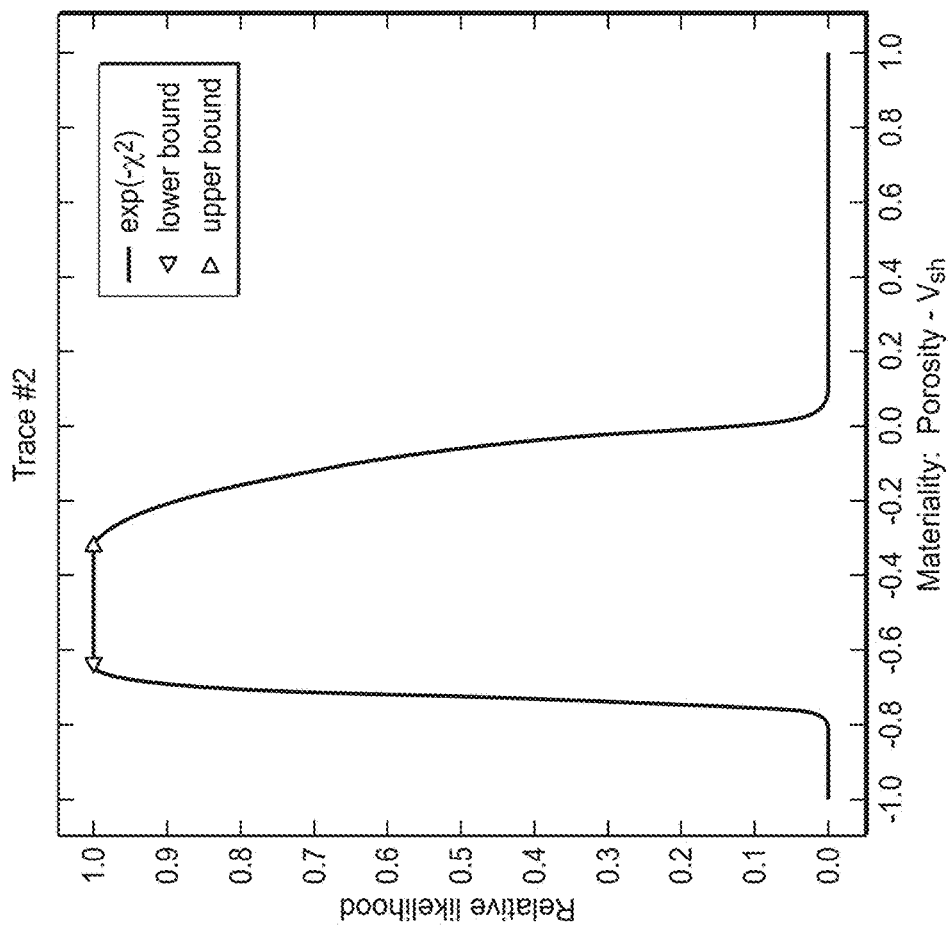
FIG. 4G is likelihood vs materiality curve extracted from FIG. 3, for only trace 2.
Figure 4F:
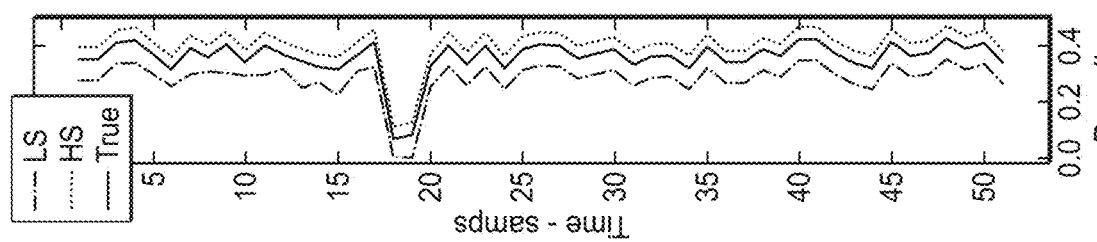
FIGS. 4E and 4F are plots, for only trace 2, for porosity and Vshale, respectively.
Figure 4E:
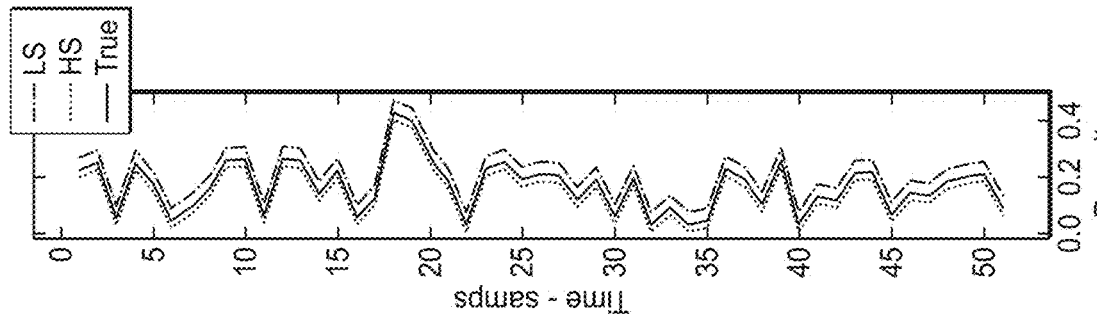

FIGS. 4E and 4F are plots, for only trace 2, for porosity and Vshale, respectively. FIG. 4G is likelihood vs materiality curve extracted from FIG. 3, for only trace 2. FIG. 4G shows the corresponding likelihood curve for trace 2, and the points corresponding to the LS and the HS models. Again, the LS and HS models inscribe the true model providing a robust measure of uncertainty. Note that the lower bound on materiality produces the LS porosity model and the HS volume of the shale model, while the upper-bound on materiality produces the HS porosity model and the LS shale model.

Figure 5:
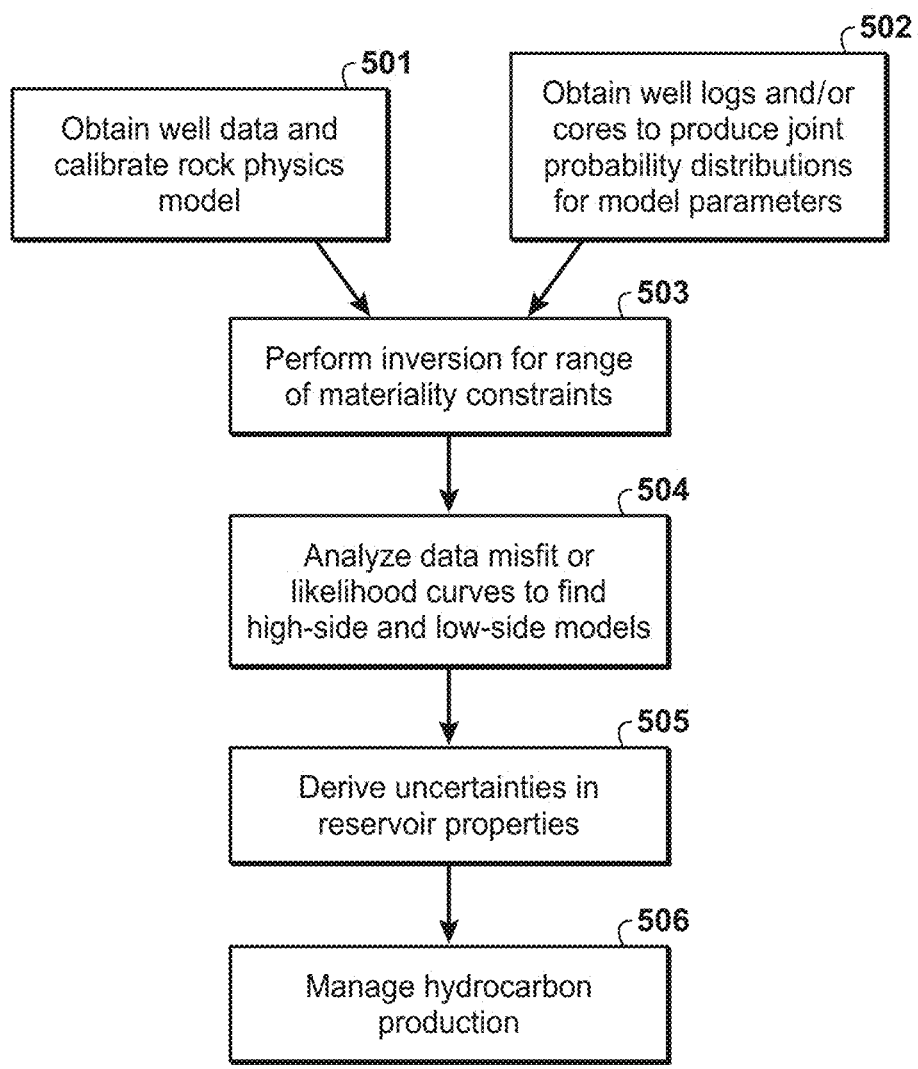
FIG. 5 illustrates an exemplary method embodying the present technological advancement.

FIG. 5 illustrates an exemplary method embodying the present technological advancement. Step 501 includes obtaining well data for calibrating a rock-physics model, which can be either linear or non-linear. The Xu-White rock physics model can be used (Xu, S. and White, R. E., "A new velocity model for clay-sand mixtures," Geophysical Prospecting 43, 91-118 (1995), the entire contents of which are hereby incorporated by reference).

Step 502 includes obtaining wells logs and/or cores to produce prior joint-probability distributions for model parameters.

Step 503 includes performing an inversion for a range of materiality constraints and possibly other constraints from steps 501 and 502.

Step 504 includes analyzing a data misfit curve or likelihood curve for solutions over a range of materiality to find models at the high-side and low-side intersections, with desired likelihood.

Step 505 includes using the extremal models or likelihood vs materiality curve to derive uncertainties in reservoir properties. Based at least in part on the subsurface image generated from the extremal models, step 505 can include estimating a subsurface property, including its uncertainty, which indicates hydrocarbon deposits in a subterranean geologic formation.

Step 506 includes managing hydrocarbons in accordance with the determined uncertainties. As used herein, hydrocarbon management includes hydrocarbon extraction, hydrocarbon production, hydrocarbon exploration, identifying potential hydrocarbon resources, identifying well locations, causing a well to be drilled, determining well injection and/or extraction rates, identifying reservoir connectivity, acquiring, disposing of and/or abandoning hydrocarbon resources, reviewing prior hydrocarbon management decisions, and any other hydrocarbon-related acts or activities.

Step 506 can also include using the present technological advancement with geophysical data that are synthetic data, and the materiality bounds can be used to assess the value of information that a specific geophysical data type adds and thus aide in planning geophysical acquisition. This may be done by performing two materiality searches with synthetic data, one with the existing data, one the existing data and the addition of the new data type in question. Comparisons in the two output ranges of materiality can help quantify, in terms of reservoir economics, the value of acquiring and using that additional data. For example, synthetic gravity data could be used with the present technological advancement, the materiality bounds can give a determination of whether an actual gravity data acquisition should be carried out.

In all practical applications, the present technological advancement must be used in conjunction with a computer, programmed in accordance with the disclosures herein. Preferably, in order to efficiently perform inversion, the computer is a high performance computer (HPC), as it is known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM.

The present techniques may be susceptible to various modifications and alternative forms, and the examples discussed above have been shown only by way of example. However, the present techniques are not intended to be limited to the particular examples disclosed herein. Indeed, the present techniques include all alternatives, modifications, and equivalents falling within the spirit and scope of the appended claims.

REFERENCES

The following references are hereby incorporated by reference in their entirety:

Buland, Arild, and Henning Omre. "Bayesian linearized AVO inversion." Geophysics, Vol. 68, No. 1 (2003): pp. 185-198;

Constable, Steven C., Robert L. Parker, and Catherine G. Constable. "Occam's inversion: A practical algorithm for generating smooth models from electromagnetic sounding data." Geophysics, Vol. 52, No. 3 (1987): pp. 289-300;

Eidsvik, Jo, et al. "Stochastic reservoir characterization using prestack seismic data." Geophysics, Vol. 69, No. 4 (2004): pp. 978-993;

Gouveia, Wences P., and John A. Scales. "Bayesian seismic waveform inversion: Parameter estimation and uncertainty analysis." Journal of Geophysical Research: Solid Earth 103.B2 (1998): pp. 2759-2779;

Lawson, Charles L., and Richard J. Hanson. Solving least squares problems. Society for Industrial and Applied Mathematics, 1995, chapter 23;

Rimstad, Kjartan, and Henning Omre. "Impact of rock-physics depth trends and Markov random fields on hierarchical Bayesian lithology/fluid prediction." Geophysics, Vol. 75, No. 4 (2010): R93-R108;

Saltzer, Rebecca and Chris Finn (2006) Exploiting the non-uniqueness of seismic inversion to obtain alternate scenarios of economic interest. SEG Technical Program Expanded Abstracts 2006: pp. 1670-1673;

Stark, Philip B., and Robert L. Parker. "Bounded-variable least-squares: an algorithm and applications." Computational Statistics 10 (1995): 129-129;

Xu, S. and White, R. E., "A new velocity model for clay-sand mixtures," Geophysical Prospecting 43, 91-118 (1995); and U.S. Patent Application No. 62/429,475, filed Dec. 2, 2016.

What is claimed is:

1. A method comprising:
obtaining geophysical data for a subsurface region;
generating, with a computer, at least two subsurface property models of the subsurface region for at least two subsurface properties by performing an inversion that minimizes a misfit between the geophysical data and forward simulated data subject to one or more constraints, the inversion including generating updates to the at least two subsurface property models for at least two different scenarios that both fit the geophysical data with a same likelihood but have different values for model materiality, with the model materiality being posed as an equality constraint in the inversion, thereby the inversion being constrained by a predetermined range of values for the model materiality,
wherein the model materiality is a functional of model parameters that characterize hydrocarbon potential of the subsurface region, and further wherein the model materiality weighs porosity of a hydrocarbon reservoir in the subsurface region against shale content of the hydrocarbon reservoir;
analyzing a geophysical data misfit curve or geophysical data misfit likelihood curve, wherein the geophysical data misfit likelihood curve is an inverse of the geophysical data misfit, plotting model likelihood as a function of model materiality over the predetermined range of values of the model materiality to identify the at least two subsurface property models that correspond to a high-side and low-side, respectively, for each of the at least two subsurface properties, with the high-side and low-side quantifying uncertainties in the subsurface properties, and further with the high-side and low-side each determined at a respective upper or lower bound for model materiality; and
prospecting for hydrocarbons in the subsurface region with the at least two models that correspond to the high-side and the low-side for each of the at least two subsurface properties, wherein the at least two subsurface properties are the shale content and the porosity.

2. The method of claim 1, wherein the model materiality further weighs the porosity of the hydrocarbon reservoir against water saturation.

3. The method of claim 1, wherein the model materiality is a linear functional of model parameters that characterize hydrocarbon potential of the subsurface region.

4. The method of claim 2, wherein the porosity, the shale content, and the water saturation are determined for a predetermined depth range in the subsurface region.

5. The method of claim 1, wherein the geophysical data is at least one of seismic, electromagnetic, or gravity.

6. The method of claim 1, wherein the at least two subsurface properties are Vshale and porosity.

7. The method of claim 1, wherein the inversion is least squares inversion.

8. The method of claim 7, wherein the least squares inversion is bounded variable least squares inversion.

9. The method of claim 8, wherein the least squares inversion is non-negative least squares inversion.

10. The method of claim 1, wherein the geophysical data is one or more of P-wave velocity Vp, S-wave velocity Vs, Vp/Vs, impedance, density, or resistivity.

11. The method of claim 10, wherein the geophysical data is one or more of seismic stacks or gathers.

12. The method of claim 11, wherein the geophysical data is controlled source electromagnetic data.

13. The method of claim 1, further comprising obtaining probability density functions for rock properties from well-logs or cores, wherein the probability density functions are included as the one or more constraints.

14. The method of claim 1, wherein three-dimensional information is included in the one or more constraints.

15. The method of claim 1, wherein a rock physics model, calibrated from well logs, is included in the one or more constraints.

16. The method of claim 1, wherein the geophysical data is synthetic data, and the prospecting for hydrocarbons includes planning a geophysical acquisition based on the high-side and low-side generated with the synthetic data.

17. The method of claim 1, wherein the model materiality is a functional that is a sum of an average for each of a plurality of model parameters that characterize hydrocarbon potential of the subsurface region.

18. The method of claim 1, further comprising generating subsurface images of the at least two subsurface property models that correspond to a high-side and low-side, and based at least in part on the subsurface images, estimating uncertainty for subsurface properties that indicate a presence or absence of hydrocarbon deposits in a subterranean geologic formation.

19. The method of claim 14, wherein the three-dimensional information included in one or more constraints is dip and azimuth derived from seismic data.

\* \* \* \* \*